(12) United States Patent  
Ramamurthy et al.

(10) Patent No.: US 9,658,331 B2
(45) Date of Patent: May 23, 2017

(54) SYNTHETIC APERTURE DOPPLER ULTRASOUND METHODS AND APPARATUS

(71) Applicant: Carestream Health, Inc., Rochester, NY (US)

(72) Inventors: Bhaskar Ramamurthy, Los Altos, CA (US); Sean Murphy, Fremont, CA (US)

(73) Assignee: Carestream Health, Inc., Rochester, NY (US)

( * ) Notice: Subject to any disclaimer, the term of this patent is extended or adjusted under 35 U.S.C. 154(b) by 405 days.

(21) Appl. No.: 14/089,417

(22) Filed: Nov. 25, 2013

(65) Prior Publication Data

US 2014/0146637 A1  May 29, 2014

Related U.S. Application Data

(60) Provisional application No. 61/729,529, filed on Nov. 23, 2012.

(51) Int. Cl.
G03B 42/06 (2006.01)
G01S 15/89 (2006.01)

(52) U.S. Cl.
CPC .............. *G01S 15/8988* (2013.01)

(58) Field of Classification Search
CPC .................................. G01S 15/8988
USPC ...................................... 367/7, 11
See application file for complete search history.

(56) References Cited

U.S. PATENT DOCUMENTS

| | | | |
|---|---|---|---|
| 4,917,097 A * | 4/1990 | Proudian | A61B 8/12 600/463 |
| 5,431,169 A | 7/1995 | Gondo | |
| 5,501,222 A | 3/1996 | Briggs | |
| 5,891,037 A * | 4/1999 | Hossack | A61B 8/13 600/443 |
| 6,135,961 A | 10/2000 | Pflugrath et al. | |
| 6,383,139 B1 | 5/2002 | Hwang et al. | |
| 6,551,246 B1 | 4/2003 | Ustuner et al. | |
| 6,663,567 B2 | 12/2003 | Ji et al. | |
| 6,679,847 B1 | 1/2004 | Robinson et al. | |
| 6,997,876 B2 | 2/2006 | Mo et al. | |
| 7,087,020 B2 | 8/2006 | Chou et al. | |
| 7,510,529 B2 | 3/2009 | Chou et al. | |
| 7,819,805 B2 | 10/2010 | Davies et al. | |
| 7,850,611 B2 | 12/2010 | Davies et al. | |
| 7,862,508 B2 | 1/2011 | Davies et al. | |
| 7,914,451 B2 | 3/2011 | Davies | |
| 8,234,923 B2 | 8/2012 | Ramamurthy et al. | |
| 2002/0169378 A1* | 11/2002 | Mo | A61B 8/00 600/437 |

(Continued)

OTHER PUBLICATIONS

Kasai, C. et al., "Real-Time Two-Dimensional Blood Flow Imaging Using an Autocorrelation Technique", IEEE Transactions on Sonics and Ultrasonics, vol. SU-32, No. 3, May 1985.

*Primary Examiner* — Daniel L Murphy

(57) ABSTRACT

Ultrasound data is acquired by a synthetic aperture technique which uses multiple ultrasound transmissions from point sources. RF data is stored and processed. Doppler velocities for pixels in an insonified region are obtained by processing the stored data. One or more pan boxes may be provided. Doppler velocities may be determined by obtaining I and Q images for a plurality of frames and performing autocorrelation across the frames for some or all pixels in the frames.

21 Claims, 3 Drawing Sheets

(56) References Cited

U.S. PATENT DOCUMENTS

| | | |
|---|---|---|
| 2009/0054770 A1 | 2/2009 | Daigle |
| 2009/0112095 A1 | 4/2009 | Daigle |
| 2011/0125017 A1* | 5/2011 | Ramamurthy ........... A61B 8/08 600/443 |
| 2011/0137174 A1* | 6/2011 | Park .................... G01S 15/8981 600/454 |

* cited by examiner

SYNTHETIC APERTURE DOPPLER ULTRASOUND METHODS AND APPARATUS

CROSS-REFERENCE TO RELATED APPLICATIONS

This application claims priority from U.S. application Ser. No. 61/729,529 filed 23 Nov. 2012. For purposes of the United States, this application claims the benefit under 35 U.S.C. §119 of U.S. application Ser. No. 61/729,529 filed 23 Nov. 2012 and entitled DOPPLER ULTRASOUND which is hereby incorporated herein by reference for all purposes.

TECHNICAL FIELD

This invention relates to ultrasound imaging and, in particular, to Doppler ultrasound imaging. Embodiments provide methods and apparatus for Doppler ultrasound imaging.

BACKGROUND

Color Doppler imaging is used to detect motion in ultrasound images. It is commonly used to detect or qualitatively assess blood flow but has also has applications in cardiology to measure motion of the heart wall (so called "tissue Doppler imaging"). Color Doppler images provide flow information over a two dimensional region. Color Doppler imaging lacks the quantitative accuracy or sensitivity of pulse Doppler or continuous wave Doppler. Sensitivity and spatial resolution are competitive characteristics of color Doppler imaging.

SUMMARY

This invention has a number of aspects. One aspect provides ultrasound imaging apparatus The ultrasound imaging apparatus may perform pixel-based imaging. The apparatus may have a Doppler imaging mode in which Doppler images are generated based on echo signals received in response to a number of diverging wave ultrasound transmissions (e.g. transmissions from point sources). In some embodiments the point sources are virtual point sources.

Another aspect of the invention provides methods for Doppler ultrasound imaging. The methods comprises acquiring echo signals from diverging wave ultrasound transmissions (e.g. transmissions from point sources). In some embodiments the point sources are virtual point sources.

some example aspects provide Doppler ultrasound imaging methods comprising: controlling one or more elements of a transducer array comprising a plurality of transducer elements to emit ultrasound transmission having wavefronts emanating from a point; detecting echoes of the ultrasound at each of a plurality of the transducer elements and storing data representing the detected echoes; processing the stored data to yield in-phase and quadrature images for each of a plurality of frames, each of the frames corresponding to one of the transmissions each of the in-phase and quadrature images comprising values corresponding to pixels; and, for each of a plurality of pixels, processing the pixel values for the pixel in the frames to yield Doppler velocity information.

In some embodiments processing the pixel values for the pixel in the frames to yield Doppler velocity information comprises performing an auto-correlation. In some embodiments processing the pixel values for the pixel in the frames to yield Doppler velocity information comprises applying a clutter filter before performing the auto-correlation. Some embodiments are configured to apply two or more different clutter filters to the same pixel values. Users may observe resulting Doppler images to determine which clutter filter is most suitable. For example, processing the pixel values for the pixel in the frames to yield Doppler velocity information may comprise: applying a first clutter filter, performing a first auto-correlation on an output of the first clutter filter and displaying a first Doppler mode image using the output of the first auto-correlation, applying a second clutter filter different from the first clutter filter to the pixel values in the frames, performing a second auto-correlation on the output of the second clutter filter and displaying a second Doppler mode image using the output of the second auto-correlation.

In some embodiments ultrasound transmissions comprise ultrasound having a frequency of at least 1 MHz. The stored data may comprise samples of the echo signals acquired at a frequency of at least 4 MHz.

One aspect provides a method as described herein the method comprises identifying an area corresponding to a user-defined pan box and identifying pixels associated with the pan box. The plurality of pixels includes the pixels associated with the pan box. The method displays a color Doppler image within a display area corresponding to the pan box. Some or all pixels outside of the pan box may not be processed to yield Doppler velocity information.

Another aspect provides ultrasound imaging apparatus. The apparatus comprises: an ultrasound transducer comprising a plurality of elements; a plurality of ultrasound transmitters configured to drive the elements to transmit ultrasound transmissions; a plurality of ultrasound receivers configured to receive ultrasound echo signals at the transducer elements; a data store; a control system; and a data processing system. The control system is operable to acquire ultrasound data for use in obtaining Doppler velocity values by: causing the ultrasound transmitters to drive the transducer elements to emit a plurality of ultrasound transmissions each comprising ultrasound emanating from a point source; and for each of the ultrasound transmissions causing the ultrasound receivers to acquire ultrasound echo signals from the transducer elements and to digitize and store digitized versions of the ultrasound echo signals in the data store. The data processing system is configured to: process the stored data to yield in-phase and quadrature images for each of a plurality of frames, each of the frames corresponding to one of the transmissions each of the in-phase and quadrature images comprising values corresponding to pixels; and, for each of a plurality of pixels, process the pixel values for the pixel in the frames to yield Doppler velocity information. The apparatus may comprise a display for displaying a Doppler image based on the Doppler velocity information. The Doppler image may comprise a color Doppler image.

Some embodiments comprise a stored focus map and wherein the data processor is configured to use the focus map to select elements of the stored data which correspond to each pixel and to combine the selected elements to yield in-phase and quadrature values for the pixel.

Further aspects of the invention and features of example embodiments of the invention are described below and illustrated in the accompanying drawings.

BRIEF DESCRIPTION OF THE DRAWINGS

The accompanying drawings illustrate non-limiting example embodiments of the invention.

DESCRIPTION

Throughout the following description specific details are set forth in order to provide a more thorough understanding to persons skilled in the art. However, well known elements may not have been shown or described in detail to avoid unnecessarily obscuring the disclosure. The following description of examples of the technology is not intended to be exhaustive or to limit the system to the precise forms of any example embodiment. Accordingly, the description and drawings are to be regarded in an illustrative, rather than a restrictive, sense.

One aspect of the invention provides apparatus and related methods for performing ultrasound imaging. Example embodiments acquire and store ultrasound data. The ultrasound data can subsequently be processed in various ways. In some embodiment, raw ultrasound data for a plurality of transmitter/receiver combinations is stored. The stored raw ultrasound data is processed to yield Doppler information. In some embodiments the Doppler information comprises color Doppler images. The stored ultrasound data may comprise radio frequency (RF) data.

Advantageously, the ultrasound data may be processed to yield Doppler information for a plurality of separate locations within a field of view of the ultrasound system used to acquire the ultrasound data. For example, Doppler information may be obtained for regions corresponding to two or more pan boxes within an image plane. In some embodiments, a system is configured to display a composite image including a B-mode portion and a plurality of color Doppler portions. For example, a user may select a position or position and size and/or shape for each of a plurality of pan boxes. The system may then be configured to display color Doppler information in each pan box. The system may be configured to compute the colour Doppler information for the areas corresponding to the pan boxes in response to the positioning of the pan boxes or to compute color Doppler information for a larger area and display the portions of the color Doppler information corresponding to the pan boxes.

Advantageously, in some non-limiting embodiments, the same ultrasound data is used to generate both the colour Doppler images and one or more other image modalities to be included in a composite display.

In some embodiments the methods can be described as "pixel-based" methods. An imaging system according to an example embodiment is shown in FIG. 1.

Figure 1:
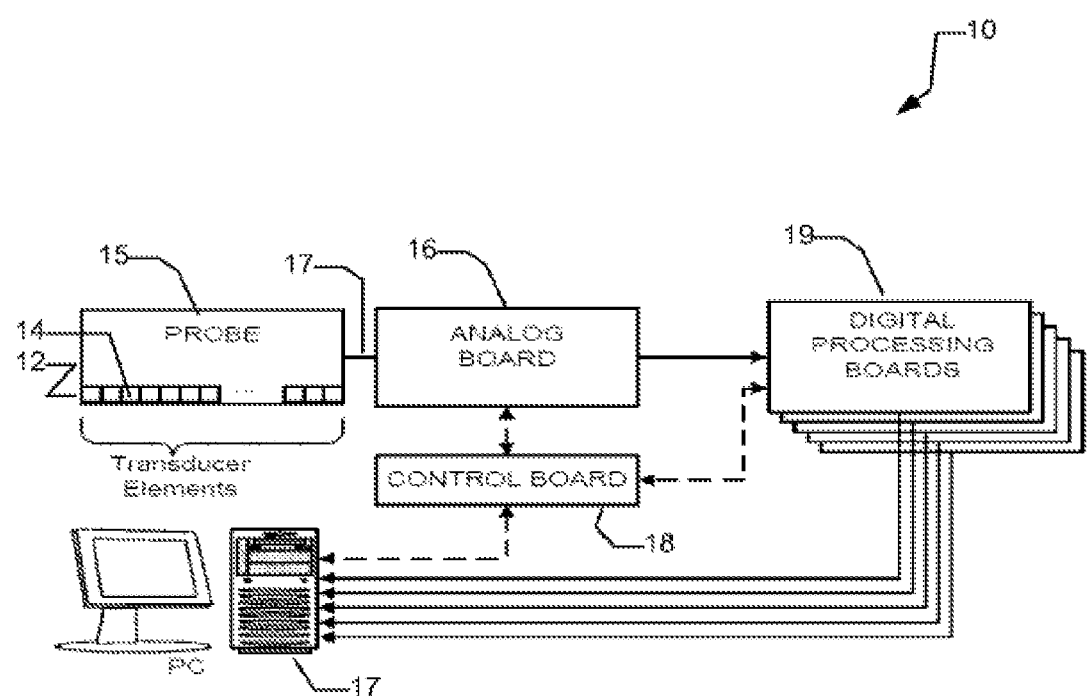
FIG. 1 is a schematic view of an imaging system according to an example embodiment.

The system 10 illustrated in FIG. 1 uses an ultrasound transducer 12 that comprises a number of transducer elements 14. The transducer elements can be driven to transmit ultrasound into a subject. Transducer 12 may be one-dimensional (e.g. have a single straight or curved line of transducer elements) or may be two-dimensional (e.g. a 2D array of transducer elements) or may comprise another arrangement of transducer elements (e.g. two or more rows of transducer elements etc.).

A probe 15 which includes the transducer elements is connected to an analog circuit Board 16 by a cable 17. A separate transmitter and a separate receiver may be provided for each transducer element although this is not mandatory. In alternative embodiments switches may be provided to multiplex the transducer elements to a smaller number of transmitters and/or receivers. Signals received at the receivers are digitized.

In some embodiments a separate analog-to-digital converter (ADC) is provided for each channel. In other embodiments multiple channels are multiplexed to a single ADC. The ADCs yield digitized signals for each channel. The digitized signals are provided to a digital processing system. The processing system may, for example, comprise one or more data processors, one or more sets of fixed logic, one or more configurable logic units or the like.

A control circuit board 18 coordinates the acquisition and processing of ultrasound data. Processing may, for example, be divided among one or more digital processing boards 19. In an example embodiment, each of the digital processing boards 19 includes a field-programmable gate array (FPGA) and local memory. The FPGAs are configured to process the digitized signals to yield image data. The image data is delivered to a computer 17 for viewing. Computer 17 may also provide a user interface to allow users to set various parameters for acquiring, processing and displaying ultrasound images.

Figure 3:
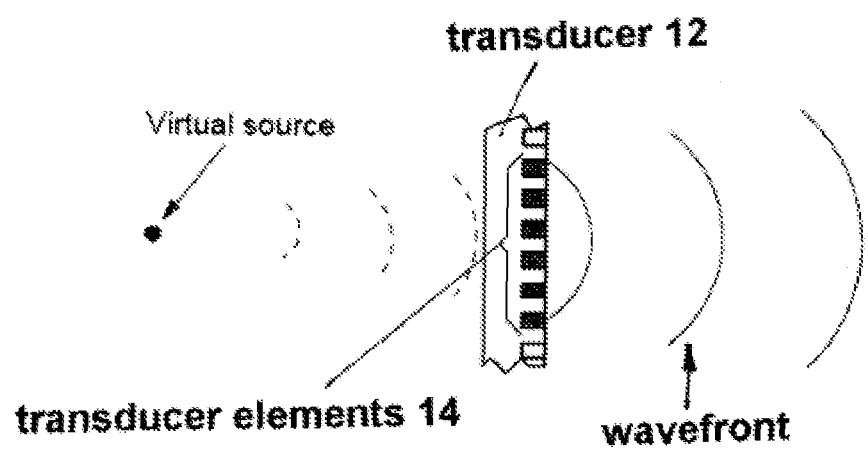
FIG. 3 illustrates the transducer elements providing a virtual point source located behind the transducer elements.

Transducer elements 14 may be driven to operate as point sources. The point sources may be achieved by operating individual transducer elements and/or by operating a number of elements together to provide a virtual point source. When the elements of a group of elements are operated together to provide a virtual point source, transmissions from the elements are timed to produce a spherical wavefront centered at a location corresponding to the virtual point source. The location of the virtual point source does not need to coincide with the location of any transducer element. For example as illustrated in FIG. 3, transducer elements may be controlled to provide a virtual point source located in the image plane behind the transducer elements.

The number of elements used to provide a virtual point source may vary depending in part on the location of the virtual point source. In some embodiments the virtual point source is located far enough behind a face of the transducer that a majority of the transducer elements can be used to provide transmissions which appear to emanate from the point source. In some embodiments at least 75%, or at least 85% or at least 95% of the transducer elements in the transducer are driven to provide a transmission from the virtual point source. In some embodiments at least 100 transducer elements are craven to provide a transmission from the virtual point source.

In an example B-mode imaging mode, after each point source firing, the system receives echo signals on all transducer elements. These echo signals are digitized and stored. The echo signals are filtered. This process is repeated for a significant number of point source transmissions. For example, the number of point source transmissions may be the same as the number of transducer elements. For example, a system may collect signals at 50 to 1500 transducer elements for each of a number of point source transmissions (for example, 30 to 500 transmissions). An example, system collects signals at 128 transducer elements for each of 64 transmissions. The transmissions may emanate from point sources at different locations.

The collected ultrasound data may be stored in a three-dimensional array. One dimension corresponds to the point source from which the ultrasound was emitted, one dimension corresponds to the transducer element at which the ultrasound was received, and one dimension corresponds to time. The time dimension may store a sequence of samples of the received ultrasound echo signals.

Images may be constructed by, for each of a number of scattering locations at predetermined locations in the subject and selecting from the collected data array those values that correspond to the scattering location. These values are summed to yield a pixel value for a pixel corresponding to the scattering location. This process of selecting and summing is repeated for each pixel. In general, a large number of raw data values (e.g. 128×128 values) will correspond to each pixel. It is not necessary to use all of these raw data values. In some cases, the system may select which values to use for each pixel based upon criteria which define a subset of the transmitter/receiver pairs to be used for the pixel.

A focus map may be used to identify those elements of the raw data which correspond to each pixel. The focus map may, for example, be provided by two tables. One table indicates the distances to the pixel (which may conveniently be expressed in terms of a number of samples) from each point source used to transmit the ultrasound. Another table indicates the distances (which may be conveniently expressed as a number of samples) from the pixel to each transducer element that may receive an echo signal from that pixel.

Doppler imaging may be performed by repeatedly firing a single point source (which may comprise a transducer element but is advantageously a virtual point source) a suitable number of times. For example, the point source may be operated 8 or 16 times. Echo signals resulting from the point source firings may be collected at a plurality of the transducer elements. The resulting raw data may be stored (for example as described above) and subsequently processed to provide colour Doppler images.

In some embodiments, each transmission for use in Doppler imaging has a duration in the range of about 1½ to about 10 µsec (which may be longer than the duration of transmissions used for B-mode imaging). B mode imaging may, for example, use transmissions each having a duration in the range of about ½ to about 2 µsec.

The frequency of the transmitted ultrasound may be selected based in part on the desired depth of penetration. High frequencies generally can produce higher resolution images and can provide better velocity resolution. However, high frequencies tend to be more strongly attenuated as they propagate through tissue than lower frequencies. In cases where significant penetration depth is required it may be necessary to use lower frequencies to obtain detectable echo signals from deep in the tissue being studied. An example of higher frequencies is frequencies over about 8 MHz. An example of lower frequencies is frequencies below about 4 MHz.

Blood flow in the body has speeds of less than 1 m/s or less than 0.07% of the typical speed of sound in tissue. In an example embodiment the raw collected data is processed to detect motion by comparison of raw data obtained in a series of pulses that are transmitted under identical conditions (known as "flow samples"). Moving scatterers cause the only difference between successive pulses so motion can be detected by comparing the raw data obtained from a number of different transmissions.

Just as in conventional color Doppler imaging, the transmissions are repeated a number of times to provide velocity samples. Where some large portion of the transducer array is used to transmit ultrasound transmissions, the entire imaging space may be insonified in one imaging sequence. In some cases the transducer and/or volume to be imaged have dimensions such that it is not practical to insonify the entire volume to be imaged in a single point source ultrasound transmission. In such cases the methods as described herein may be performed separately for different parts of the volume using ultrasound point sources having different locations (in some cases the different ultrasound point sources may be transmitted using different subsets of the transducer elements) to be imaged and the resulting Doppler images may be merged to yield a composite image covering the volume to be imaged.

In some embodiments the stored ultrasound data is processed to provide full-frame color Doppler images. To facilitate this, the transducer may be operated to provide a virtual point source. In the case of a curved transducer the virtual point source may be located at the ROC (radius of curvature) behind the transducer. All the transducer elements or a subset of the elements may be configured to transmit.

A set of RF data may be acquired and stored for each transmission. The RF data and may then be used for forming images after the acquisition is complete. Any of number of imaging parameters may be changed retrospectively such as speed of sound, apodization, rf filters and the like.

The RF data may be represented as a plurality of sets of samples, each set comprising a sequence of samples of the signal received at a particular one of the receiving transducer elements in response to a transmission.

Processing the RF data to yield color Doppler images may involve processing the RF data for each transmission to create a frame comprising in-phase and quadrature pixel images (more-generally complex-valued pixel images) and then performing auto-correlation or zero-crossing detection on pixels across the frames to yield Doppler values that may be represented in color on a display. Various filtering steps may also be performed to improve the resulting color Doppler images.

In an example embodiment, echo signals resulting from an ultrasound transmission are received at a plurality of receiving elements each at a different location in relation to a point source (which may be a virtual point source) from which the ultrasonic signal transmission emanates or appears to emanate. The received echo signals are sampled at a frequency higher than the frequency of the transmitted ultrasound (e.g. at 4 times the frequency of the transmitted ultrasound). The samples are then stored.

Before and/or after being stored the echo signals may be filtered. Filtering may be performed in the analog and/or digital domains. The filtering may include an anti-aliasing filter. For example, an analog anti-aliasing filter may be applied before sampling the received echo signals. The filtering may also include bandpass filtering. For example, a digital filter may include a bandpass filter having a center frequency centered on or near a frequency of the transmitted ultrasound signal such that noise in the received signals is rejected.

The stored data may be processed to provide a frame by locating the samples received at each receive element that correspond to each of a plurality of pixels. The association between received samples and pixels may be determined in advance from the geometry of the ultrasound transducer and the locations of the pixels relative to the point source and the receive elements at which signals are received. The time interval between the start of an ultrasound transmission and the time at which echoed ultrasound from a particular pixel within a subject will be received depends on the distance from the point source to the pixel, the distance from the pixel to the receive element at which the echo signal is detected and the speed of sound. This time will, in general, be different for each receive element (since different receive elements are, in general, at different distances from the pixel location).

Since the received echo signals are sampled at known intervals starting at a known time relative to the transmission, the time at which the echo signal from a particular pixel will be received at a particular receive element can be expressed in terms of a sample number. In this way, each pixel within the subject can be associated with a sample in each of the received signals.

Since the speed of sound, the transducer geometry, the location of a point source to be used for transmissions, and the sampling frequency can all be known in advance, the set of samples corresponding to a pixel may be determined in advance.

The received echo signals can be characterised in terms of phase and amplitude. One way to express this is to process the received echo signals to provide two numbers respectively representing the values of in-phase and quadrature components associated with each pixel. These values may be summed for each pixel to yield a frame.

In some embodiments each frame comprises an in-phase image (with pixel values corresponding to the summed in-phase or "I" components) and a quadrature image (with pixel values corresponding to the summed quadrature or "Q" components).

One can obtain several frames (which may each comprise an I image and a Q image) by generating several transmissions and receiving and processing the resulting echo signals as described above. Data from these frames can be processed to yield Doppler data. This processing is done across the frames (i.e. performing operations such as filtering and/or autocorrelation on a series of values corresponding to the same pixel in different frames). In some embodiments the Doppler frequency for a pixel is determined by taking a Fourier transform of the values for the pixel in question across the available frames. A less computationally intensive method comprises using a cross-correlation technique to obtain the Doppler frequencies.

Velocity estimation may be performed, for example, by applying the Kasai autocorrelation algorithm as described in Chihiro Kasai, Koroku Namekawa, Akira Koyano, and Ryozo Omoto, *Real-Time Two-Dimensional Blood Flow Imaging Using an Autocorrelation Technique*, IEEE Trans. Sonics and Ultrasonics, vol. SU-32 No. 3, May 1985 which is hereby incorporated herein by reference for all purposes.

In some embodiments a clutter or wall filter is applied across the frames. This filter may be a high-pass filter. The clutter filter is applied separately to I and Q images. In some embodiments two or more alternative clutter filters are provided. Since the raw data is stored, a user can view Doppler images formed using one clutter filter and then reprocess the data using one or more other clutter filters to see which clutter filter provides the best results.

In this example embodiment, after the clutter filter has been applied, velocity estimates are obtained for the pixels. This may be done by performing autocorrelation across the frames. In an example embodiment, autocorrelation is performed by computing the value:

$$v = \frac{c}{2*t_{PRI}*(2*\pi*f)*\cos\theta} \tan^{-1} \frac{\sum_{a=2}^{m'}\{Q(a)I(a-1) - Q(a-1)I(a)\}}{\sum_{a=2}^{m'}\{I(a)I(a-1) + Q(a)Q(a-1)\}}$$

where:
v=mean velocity in m/s; c=speed of sound in m/s; $t_{PRI}$=Pulse Repetition interval; f=center frequency in Hz; m'=is the number of frames available for processing (since applying a clutter filter generally reduces the number of frames m' is the number of frames after the clutter filter has been applied); θ is the angle between the sound beam and the flow velocity vector for blood (or other flowing substance being studied); a=an index which identifies individual frames being processed; and I and Q are respectively the I and Q values for a pixel in frame a. The $\tan^{-1}$ function has a value in the range of between $-\pi$ and $+\pi$ radians.

cos(θ) may be set to equal 1 in cases where the direction of blood flow is not known. Some information about θ may be determined from the signs of the numerator and denominator of the argument of the $\tan^{-1}$ function in the above equation. Specifically: if the numerator and denominator are positive, θ is between 0 and $\pi i/2$; if the numerator>0 and denominator<0, θ is between $\pi/2$ and $\pi$; if the numerator<0 and denominator>0, θ is between 0 and $-\pi/2$; and, if the numerator<0 and denominator<0, θ is between $-\pi r/2$ and $-\pi$.

Velocity values may be determined for all or a subset of the pixels. Colors may be assigned to the different velocity values. The resulting image may be displayed, stored and/or printed as a color Doppler image.

In some embodiments, the bandwidth or variance of the spectrum (calculated either with the Fourier transform or with cross-correlation) is used to provide quality information about calculated Doppler values. Pixels with high variance may be disregarded as being unreliable.

In an example embodiment, variance is calculated by computing:

$$VAR = \frac{c}{t_{PRI}^2*(2*\pi*f)*\cos\theta}$$

$$\left[1 - \frac{1}{W}\left\{\left[\frac{1}{M-1}\sum_{a=2}^{m'} Q(a)I(a-1) - Q(a-1)I(a)\right]^2 + \left[\frac{1}{M-1}\sum_{a=2}^{m'} I(a)I(a-1) + Q(a-1)Q(a)\right]^2\right\}^{\frac{1}{2}}\right]$$

Where $W = \frac{1}{M-1}\sum_{a=1}^{M-1}[Q^2(m) + I^2(m)]$.

It can be appreciated that the foregoing methods and apparatus permit color Doppler images containing velocity values for all pixels in an area insonified by point source pulses to be obtained from a single set of transmissions. However, computation may be saved in cases where it is desired to obtain a color Doppler image that contains only a subset of the pixels. Some embodiments provide a user control which allows a user to specify a subset of pixels to which Doppler processing will be applied. Such a user control may allow a user to define a pan box. A pan box is a user-settable area within which flow information is desired. When a pan box has been defined a system may determine which pixels lie within the pan box and may compute Doppler velocities only for those pixels lying within the pan box.

Unlike conventional color Doppler systems, a system as described herein may permit a user to define two or more distinct pan boxes. The system may identify which pixels correspond to (lie within) the two or more pan boxes and may then compute Doppler velocities only for pixels corresponding to the pan boxes. In some embodiments multiple pan boxes are provided. Many conventional Doppler imaging systems can only provide one pan box.

Ultrasound images from another imaging mode (e.g. B mode) may be displayed outside of the pan boxes.

Figure 2:
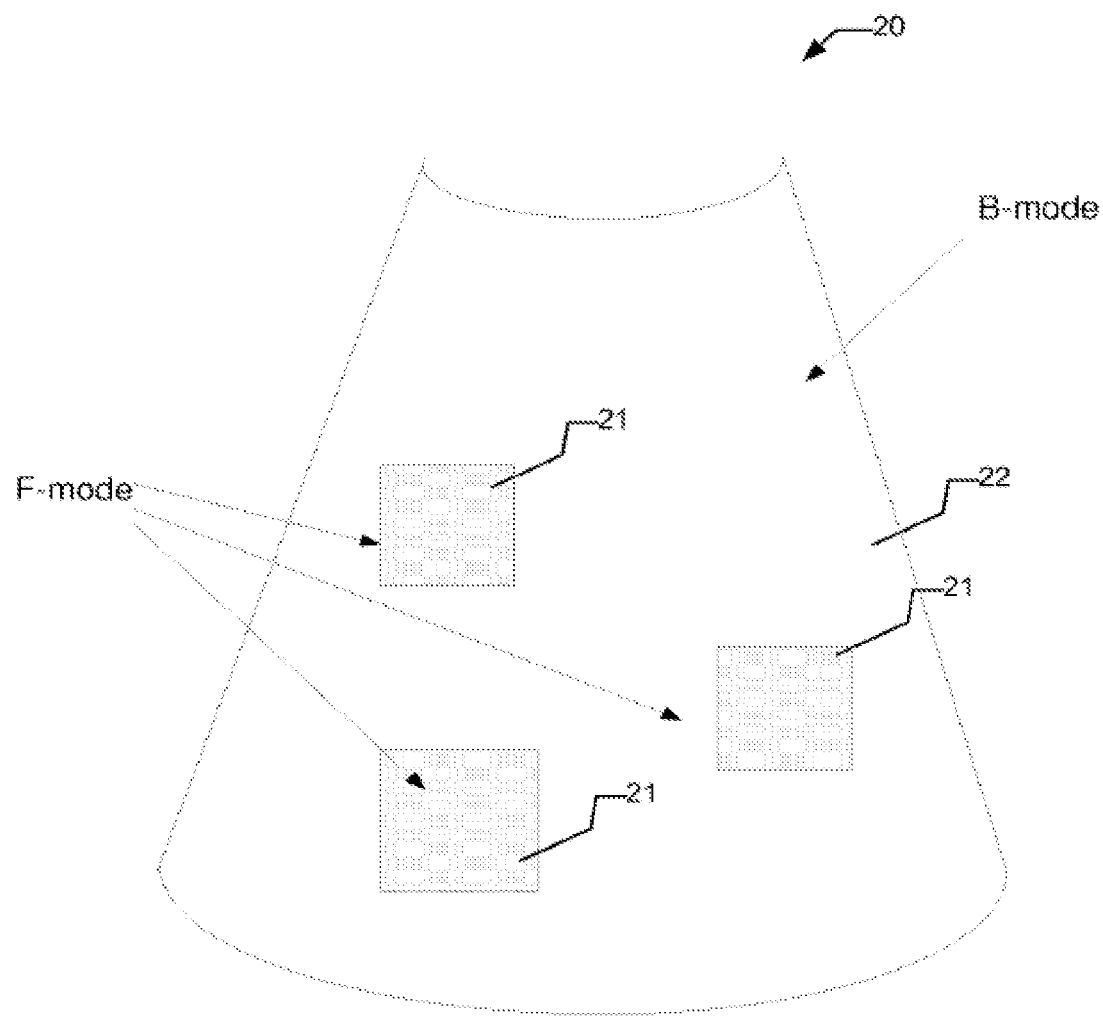
FIG. 2 is an example of a composite display including a plurality of pan boxes.

Velocity or other information may be obtained for regions corresponding to one, two or many pan boxes. FIG. 2 shows a sample composite image 20 that illustrates the concept of multiple pan boxes 21. Pan boxes 21 define areas of the image which are displayed as flow-mode (F mode) images. Areas 22 outside pan boxes 21 may show a B mode image.

In some embodiments pixel density is variable. The same raw data may be processed to provide Doppler velocities for pixels that are closely-spaced or more widely-spaced apart. Pixel spacing may be settable by a user.

In some embodiments, B mode images and color Doppler images are both obtained. The B mode images may be interleaved with the color Doppler images. Various interleaving patterns may be provided. For example, one or more B mode images (i.e. 1 to N B mode images) may be obtained between adjacent color Doppler images or vice versa.

Features as described herein may be provided, by way of non-limiting example, in ultrasound systems as described in U.S. patent application Ser. No. 11/385,482 filed 20 Mar. 2006 entitled SYSTEMS AND METHODS FOR ULTRASOUND IMAGING (now U.S. Pat. No. 8,234,923) and U.S. patent application Ser. No. 13/569,081 Filed 7 Aug. 2012 for SYSTEMS AND METHODS FOR ULTRASOUND IMAGING both of which are hereby incorporated herein by reference for all purposes.

Any function or functions of apparatus described herein may also be implemented as a method. The method may be executed by apparatus that is the same or different from that described herein. Any step or steps of a method as described herein may also be implemented as apparatus configured to perform the method step or steps.

INTERPRETATION OF TERMS

Unless the context clearly requires otherwise, throughout the description and the claims:

"comprise", "comprising", and the like are to be construed in an inclusive sense, as opposed to an exclusive or exhaustive sense; that is to say, in the sense of "including, but not limited to".

"connected", "coupled", or any variant thereof, means any connection or coupling, either direct or indirect, between two or more elements; the coupling or connection between the elements can be physical, logical, or a combination thereof.

"herein", "above", "below", and words of similar import, when used to describe this specification shall refer to this specification as a whole and not to any particular portions of this specification.

"or", in reference to a list of two or more items, covers all of the following interpretations of the word: any of the items in the list, all of the items in the list, and any combination of the items in the list.

the singular forms "a", "an", and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present) depend on the specific orientation of the apparatus described and illustrated. The subject matter described herein may assume various alternative orientations. Accordingly, these directional terms are not strictly defined and should not be interpreted narrowly.

Embodiments of the invention as well as any controller, logic or data processor may be implemented using suitable specifically designed hardware, configurable hardware, programmable data processors configured by the provision of software (which may optionally comprise 'firmware') capable of executing on the data processors, special purpose computers or data processors that are specifically programmed, configured, or constructed to perform one or more steps in a method as explained in detail herein and/or combinations of any two or more of these. Examples of specifically designed hardware are: logic circuits, application-specific integrated circuits ("ASICs"), large scale integrated circuits ("LSIs"), very large scale integrated circuits ("VLSIs") and the like. Examples of configurable hardware are: one or more programmable logic devices such as programmable array logic ("PALs"), programmable logic arrays ("PLAs") and field programmable gate arrays ("FPGAs"). Examples of programmable data processors are: microprocessors, digital signal processors ("DSPs"), embedded processors, graphics processors, math co-processors, general purpose computers, server computers, cloud computers, mainframe computers, computer workstations, and the like. For example, one or more data processors in a control circuit for an ultrasound system may implement methods as described herein by executing software instructions in a program memory accessible to the processors.

Processing may be centralized or distributed. Where processing is distributed, information including software and/or data may be kept centrally or distributed. Such information may be exchanged between different functional units by way of a communications network, such as a Local Area Network (LAN), Wide Area Network (WAN), or the Internet, wired or wireless data links, electromagnetic signals, or other data communication channel.

For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

The invention may also be provided in the form of a program product. The program product may comprise any non-transitory medium which carries a set of computer-readable instructions which, when executed by a data processor, cause the data processor to execute a method of the invention. Program products according to the invention may be in any of a wide variety of forms. The program product may comprise, for example, non-transitory media such as magnetic data storage media including floppy diskettes, hard disk drives, optical data storage media including CD ROMs, DVDs, electronic data storage media including ROMs, flash RAM, EPROMs, hardwired or preprogrammed chips (e.g., EEPROM semiconductor chips), nanotechnology memory, or the like. The computer-readable signals on the program product may optionally be compressed or encrypted.

In some embodiments, aspects of the invention may be implemented in software available for execution by a data processor. For greater clarity, "software" includes any instructions executed on a processor, and may include (but is not limited to) firmware, resident software, microcode, and the like. Both processing hardware and software may be centralized or distributed (or a combination thereof), in whole or in part, as known to those skilled in the art. For example, software and other modules may be accessible via local memory, via a network, via a browser or other application in a distributed computing context, or via other means suitable for the purposes described above.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

It is therefore intended that the following appended claims and claims hereafter introduced are interpreted to include all such modifications, permutations, additions, omissions and sub-combinations as may reasonably be inferred. The scope of the claims should not be limited by the preferred embodiments set forth in the examples, but should be given the broadest interpretation consistent with the description as a whole.

What is claimed is:

1. A Doppler ultrasound imaging method comprising:
   controlling one or more elements of a transducer array comprising a plurality of transducer elements to emit ultrasound transmission having wavefronts emanating from a point, the ultrasound transmission having a frequency of at least 1 MHz;
   detecting echoes of the ultrasound at each of a plurality of the transducer elements and storing data representing the detected echoes, the stored data comprising samples of the echo signals acquired at a frequency of at least 4 MHz;
   processing the stored data to yield in-phase and quadrature images for each of a plurality of frames, each of the frames corresponding to one of the transmissions each of the in-phase and quadrature images comprising values corresponding to pixels; and,
   for each of a plurality of pixels, processing the pixel values for the pixel in the frames to yield Doppler velocity information.

2. The method according to claim 1 wherein processing the pixel values for the pixel in the frames to yield Doppler velocity information comprises performing an auto-correlation.

3. The method according to claim 2 wherein processing the pixel values for the pixel in the frames to yield Doppler velocity information comprises applying a clutter filter before performing the auto-correlation.

4. The method according to claim 2 wherein processing the pixel values for the pixel in the frames to yield Doppler velocity information comprises applying a first clutter filter, performing a first auto-correlation on an output of the first clutter filter and displaying a first Doppler mode image using the output of the first auto-correlation, applying a second clutter filter different from the first clutter filter to the pixel values in the frames, performing a second auto-correlation on the output of the second clutter filter and displaying a second Doppler mode image using the output of the second auto-correlation.

5. The method according to claim 1 comprising storing the collected samples of the echo signals in a three-dimensional array wherein one dimension corresponds to a point source from which the ultrasound was emitted, a second dimension corresponds to an element of the transducer at which the echo signal was received, and a third dimension corresponds to time.

6. The method according to claim 1 comprising displaying a color Doppler image corresponding to the Doppler velocity information.

7. The method according to claim 6 comprising identifying an area corresponding to a user-defined pan box, identifying pixels associated with the pan box, wherein the plurality of pixels includes the pixels associated with the pan box and displaying the color Doppler image comprises displaying the color Doppler image within a display area corresponding to the pan box.

8. The method according to claim 7 wherein the pan box is a first pan box and the method comprises identifying an area corresponding to a second user-defined pan box, identifying pixels associated with the second pan box, wherein the plurality of pixels includes the pixels associated with the second pan box and displaying the color Doppler image comprises displaying the color Doppler image within display areas corresponding to the first and second pan boxes.

9. The method according to claim 8 comprising in a display area outside of the first and second pan boxes displaying B mode ultrasound image data.

10. The method according to claim 1 wherein controlling the one or more elements of the transducer array to emit the ultrasound transmission having wavefronts emanating from the point comprises operating a group of the elements of the transducer together to provide a virtual point source by timing transmissions from the elements to produce a spherical wavefront centered at a location corresponding to the virtual point source.

11. The method according to claim 10 wherein the virtual point source is at a location that does not coincide with the location of any of the elements of the transducer.

12. The method according to claim 11 wherein the virtual point source is located behind the elements of the transducer.

13. Ultrasound imaging apparatus comprising:
   an ultrasound transducer comprising a plurality of elements;
   a plurality of ultrasound transmitters configured to drive the elements to transmit ultrasound transmissions, the ultrasound transmission having a frequency of at least 1 MHz;

a plurality of ultrasound receivers configured to receive ultrasound echo signals at the transducer elements;
a data store;
a control system; and
a data processing system;
the control system operable to acquire ultrasound data for use in obtaining Doppler velocity values by:
  causing the ultrasound transmitters to drive the transducer elements to emit a plurality of ultrasound transmissions each comprising ultrasound emanating from a point source; and
  for each of the ultrasound transmissions causing the ultrasound receivers to acquire ultrasound echo signals from the transducer elements and to digitize and store digitized versions of the ultrasound echo signals in the data store, the stored data comprising samples of the echo signals acquired at a frequency of at least 4 MHz;
the data processing system configured to:
  process the stored data to yield in-phase and quadrature images for each of a plurality of frames, each of the frames corresponding to one of the transmissions each of the in-phase and quadrature images comprising values corresponding to pixels;
  for each of a plurality of pixels, process the pixel values for the pixel in the frames to yield Doppler velocity information.

14. The apparatus according to claim 13 comprising a stored focus map wherein the data processor is configured to use the focus map to select elements of the stored data which correspond to each pixel and to combine the selected elements to yield in-phase and quadrature values for the pixel.

15. The apparatus according to claim 14 wherein the data processor is configured to apply a clutter filter to the pixel values for the pixel in the frames before processing the pixel values for the pixel in the frames to yield Doppler velocity information.

16. The apparatus according to claim 15 wherein the data processor is configured to process the pixel values for the pixel in the frames by applying an auto-correlation function to yield the Doppler velocity information.

17. The apparatus according to claim 15 comprising a user interface configured to receive user identification of a region corresponding to a pan box wherein the data processor is configured to display a color Doppler image based on the Doppler velocity information in an image region corresponding to the pan box.

18. The apparatus according to claim 17 wherein the user interface is configured to receive user identification of regions corresponding to a plurality of pan boxes and the data processor is configured to display a color Doppler image based on the Doppler velocity information in image regions corresponding to each of the pan boxes.

19. The apparatus according to claim 13 wherein the control system is configured to operate a group of the elements of the transducer together to provide a virtual point source by timing transmissions from the elements of the group to produce a spherical wavefront centered at a location corresponding to the virtual point source.

20. The apparatus according to claim 19 wherein the virtual point source is at a location that does not coincide with the location of any of the elements of the transducer.

21. The apparatus according to claim 20 wherein the virtual point source is located behind the elements of the transducer.

* * * * *